United States Patent [19]

Patel et al.

[11] Patent Number: 5,252,634
[45] Date of Patent: Oct. 12, 1993

[54] LOW VOC (VOLATILE ORGANIC COMPOUNDS), SOLVENT-BASED THERMOPLASTIC PIPE ADHESIVES WHICH MAINTAIN JOINT ADHESIVE PERFORMANCE

[76] Inventors: Naresh D. Patel, 9223 Paso Robles, Northridge, Calif. 91325; Mark W. Brown, 9216 Tweedy La., Downey, Calif. 90240

[21] Appl. No.: 837,810

[22] Filed: Feb. 18, 1992

[51] Int. Cl.$^5$ ............... C08J 9/32; C08K 5/34; C08K 5/15; C08K 5/20
[52] U.S. Cl. ............... 523/218; 524/104; 524/113; 524/233; 524/360; 524/365; 524/465
[58] Field of Search ............... 523/218, 219; 524/104, 524/113, 233, 360, 365, 465

[56] References Cited

U.S. PATENT DOCUMENTS

| | | | |
|---|---|---|---|
| 3,468,834 | 9/1969 | Oda et al. | 524/365 |
| 3,615,791 | 10/1971 | Thomas et al. | 524/360 |
| 4,309,334 | 1/1982 | Valitsky | 523/219 |
| 4,672,084 | 1/1987 | Dierdorf et al. | 524/113 |
| 4,675,354 | 6/1987 | Sperling | 524/99 |
| 4,687,798 | 8/1987 | King, Sr. | 524/100 |
| 5,010,120 | 4/1991 | Sugira | 523/219 |
| 5,047,451 | 9/1991 | Barrett et al. | 524/233 |

FOREIGN PATENT DOCUMENTS

| | | | |
|---|---|---|---|
| 0370844 | 5/1990 | European Pat. Off. | 524/104 |
| 0011931 | 2/1974 | Japan | 524/233 |
| 0088042 | 8/1978 | Japan | 524/360 |
| 0111543 | 8/1979 | Japan | 524/360 |
| 0187067 | 10/1984 | Japan | 524/360 |

Primary Examiner—Paul R. Michl
Assistant Examiner—Peter Szekely
Attorney, Agent, or Firm—Joseph A. Yanny

[57] ABSTRACT

A low volatile organic compound emitting thermoplastic pipe adhesive includes a resin, one or more solvents, a low specific gravity filler such as hollow ceramic spheres and a thixotropic agent for maintaining the homogeneity of the adhesive mixture.

21 Claims, No Drawings

LOW VOC (VOLATILE ORGANIC COMPOUNDS), SOLVENT-BASED THERMOPLASTIC PIPE ADHESIVES WHICH MAINTAIN JOINT ADHESIVE PERFORMANCE

BACKGROUND OF THE INVENTION

1. Field of the Invention

Solvent-based adhesives have been in use for joining thermoplastic pipe for over 30 years. The development of these adhesives is largely responsible for the growth of the thermoplastic pipe industry. Several billion pounds of plastic pipe are produced each year in North America. Rapid-setting, solvent-based adhesives weld the pipes together in a timely manner. These rapid-setting adhesives allow for the testing and trouble shooting of piping systems in a matter of hours while maintaining the long term durability of the pipe itself. These characteristics: rapid set, ease of use, long term durability along with low cost have made the joining of plastic pipe by solvent-based adhesives a practical and economic system.

2. The State of the Art

The solvent-based adhesives work primarily by two means of action. First, the solvent portion of the formulation softens the outer surfaces of the pipe through solvation of the plastic. Subsequently, the adhesive joint 'cures' (hardens) by means of the solvents evaporating to the surrounding atmosphere from the pipe. Secondly, the resin dissolved in the adhesive dries through solvent evaporation and provides continuity between the welded pipe surfaces which aid in preserving the integrity of the entire pipe system.

These adhesives cure rapidly, within a matter of hours, often allowing piping systems to be tested the same day as constructed. However, perhaps the most important benefit of these solvent-based adhesives is the maintenance of the integrity of the pipe itself. The resin is the same as the plastic pipe. This provides a high degree of long term durability for the piping system, often up to 30-40 years useful life. This is essential for these systems which are built into the structures of homes and buildings or are buries underground.

Thousands of miles of thermoplastic piping systems are constructed each day throughout the world, primarily by the means previously described. These systems are used in the transfer of potable water for drinking; drain, waste and vent (DWV) applications in home and industry; turf and agricultural sprinkler systems; jacuzzi, spa and tub connections; etc. These systems are crucial to the maintenance of safe and healthy means of transport of water and other chemicals throughout the world.

Evaporation of solvents from adhesives is a concern to an environmentally concerned world along with all other potential sources of air pollution. Typical solids (non-volatile) contents of plastic pipe adhesives are: 10-20% for PVC and CPVC; 15-30% for ABS. The balance of the formulation is solvent. By definition, the solvents normally used; THF, MEK, Cyclohexanone, Acetone and DMF are considered VOC's. That is, they are volatile compounds which contain the element carbon excluding methane, carbon monoxide, carbon dioxide, carbonic acid, metallic carbides and carbonates, ammonium carbonate and exempt compounds such as Methylene Chloride and 1,1,1 Trichloroethane. Typical VOC contents of PVC and CPVC solvent adhesives range from 775-850 grams/liter; ABS adhesives range from 650-750 grams/liter.

Regulations are being created each day throughout North America regarding allowable VOC levels in adhesive formulations. Federal, state and local agencies are beginning to adopt strict measures to drastically reduce these levels. The South Coast Air Quality Management District (SCAQMD) in the Los Angeles area has been a leader in this area with rules such as SCAQMD Rule 1168. Rule 1168 provides a maximum limit for VOC emissions in PVC and CPVC adhesives of 450 g/l and in ABS adhesives of 350 g/l, effective Jan. 1, 1994. The determination of VOC levels is prescribed by Rule 316A.

DETAILED DESCRIPTION OF THE PREFERRED EMBODIMENT

The most obvious approach to solving the problem of VOC's is to lessen the volatile portion of the formulation by adding either more resin or filler to the adhesive. However, adding more resin to the solution is problematic in that current formulations are near the upper limit of resin content per solvation abilities of the solvents. The extent to which more resin may be added (app. 1-5% PVC or CPVC; 1-10% ABS) has an insignificant effect on the reduction of VOC's in a formulation. Any additional resin content will result in a 'gel' which is unworkable and incapable of fusing pipe together.

Adding filler to the formulation reduces the concentration of volatiles of a given compound. However, fillers are significantly higher in density than the base solution and therefore any reduction of volatiles by increase in solids content is negated by the rapidly increasing weight per unit volume. Significant volume displacement of volatiles by filler is accomplished only by high mass content which unacceptably comprises the ability of the formulation to perform as an adhesive.

The importance of increasing solids content while maintaining or decreasing the density of a formulation are essential to any solvent-based solution to the VOC problem. The present invention is formulated adhesives which incorporate hollow, silica-alumina alloy, ceramic fillers (e.g. Zeelan Z-Light spheres) which have densities lower than any of the individual components of the base adhesive. These fillers provide a means of rapidly reducing the density of a formulation while decreasing the volatile volume.

The unique property of these hollow fillers is low density. The density of these fillers is even lower than any of the individual components in the standard formulations. This presents a problem with regard to keeping the filler particles from floating to the top of a given solution. Thixotropic agents are required with these hollow fillers to make a workable formulation with regard to shelf stability; a necessity for commercial use. Thixotropic agents such as fumed silica (e.g. Cab-O-Sil, Aerosil) and treated bentonite clay (e.g. Bentone 27) can be used at low levels. Materials such as Methacrylate Butadiene Styrene (e.g. BTA III N2) or Acrylonitrile Butadiene rubber (e.g. Hycar 1472) may also be used to keep the hollow filler in suspension.

Lower molecular weight PVC, CPVC and ABS resins were compounded at higher solids content than would be normally achievable with standard resins. This provided another avenue for decreasing volatiles.

Alternative resins such as Acrylics can be compounded into the formulation and used as a polymeric filler. These resins, such as Rohm & Haas VS 100, have a higher degree of solubility in the solvents previously listed along with a lower density than the standard resins. They also have the unique characteristic of acting as an adhesion promoter to thermoplastic pipe. These resins also facilitate taking up volume in a given formulation.

Exempt compounds such as Methylene Chloride and 1,1,1 Trichloroethane are compatible with the materials presented here. These compounds are considered exempt from VOC status and may be compounded at levels sufficient enough to significantly lower VOC levels in adhesive formulations.

Combinations of these compounds: ceramic filler, thixotropic agents, lower molecular weight resins and/or alternative resins coupled with the standard resin and solvents may be formulated to maintain the ultimate performance required while significantly reducing the VOC levels.

TYPICAL FORMULATIONS

Typical formulations would include the following compositions:

EXAMPLE FORMULATION 1

| | PARAMETERS | |
|---|---|---|
| Primary Solvents: | PVC, CPVC, ACRYLIC | ABS |
| Tetrahydrofuran | X | — |
| Methyl Ethyl Ketone | — | X |

| Secondary Solvents: | PVC, CPVC, ACRYLIC | ABS |
|---|---|---|
| 1,1,1, Trichloroethane | X | X |
| Methylene Chloride | X | X |
| Cyclohexanone | X | X |
| N-Methyl-2-Pyrrolidone | X | X |
| Methyl Ethyl Ketone | X | — |
| Acetone | X | X |
| ..Dimethyl Formamide | X | — |

| Resins: | % Concentration | Inherent Viscosity |
|---|---|---|
| PVC | 5–30 | 0.4–0.95 |
| CPVC | 5–30 | 0.4–0.95 |
| ABS | 15–45 | — |
| ACRYLIC | 5–55 | — |

| Fillers: | % Concentration | |
|---|---|---|
| Hollow cermaic spheres (Z-Light microspheres) | 1–40 (15–20 typical) | |

| Thixotropic Agents | % Concentration | % Typical |
|---|---|---|
| Cab-O-Sil/Aerosil | 0.5–8.0 | 1.0–3.0 |
| Bentone 27 | 0.5–8.0 | 2.0–5.0 |
| BTA III N2 | 0.5–8.0 | 1.0–5.0 |
| Hycar 1472 | 0.5–8.0 | 0.5–3.0 |

EXAMPLE FORMULATION 2

| | Typical Formulations | | | |
|---|---|---|---|---|
| Formulas: | PVC | CPVC | ACRYLIC | ABS |
| THF | 24.0 | 24.0 | 33.0 | — |
| MEK | 31.5 | 31.5 | 16.5 | 55.0 |
| CYCLO-HEXANONE | 9.0 | 9.0 | 8.0 | — |
| PVC | 11.0 | — | — | — |
| CPVC | — | 11.0 | — | — |
| ABS | — | — | — | 24.0 |
| VS 100 | 5.0 | 5.0 | 25.0 | — |
| HYCAR 1472 | 0.5 | 0.5 | — | — |
| Z-LIGHT W 1000 | 18.0 | 18.0 | 16.5 | 20.0 |
| AEROSIL | 1.0 | 1.0 | 1.0 | 1.0 |
| 200 Viscosity: (cps) | 1350 | — | 2025 | 3500 |
| Specific: Gravity | 0.882 | — | 0.914 | 0.842 |
| VOC (g/l) | 569 | 573 | 526 | 463 |
| | 395 | 316 | 273 | 264 |

| | Solvent Ranges | | | |
|---|---|---|---|---|
| Solvents: | PVC, CPVC ACRYLIC (ranges) | PVC, CPVC ACRYLIC (typical) | ABS (ranges) | ABS (typical) |
| THF | 0–70 | 20–40 | — | — |
| MEK | 0–50 | 20–40 | 0–70 | 40–60 |
| CYCLO-HEXANONE | 0–30 | 5–20 | 0–70 | — |
| NMP | 0–60 | 5–20 | 0–70 | — |
| ACETONE | 0–30 | 5–20 | 0–70 | — |
| DMF | 0–30 | 5–20 | — | — |

ALTERNATIVE EMBODIMENT

The major portion of solvent emission from solvent-based, thermoplastic pipe adhesives occurs during application of the adhesive to the pipe. The sources of these emissions are the primer used to prepare the pipe surface, open containers filled with adhesive, as well as, the bead applied to the pipe and fittings themselves, including spillage of adhesive onto the ground during application. Once the pipe and fittings are welded together the contribution from the adhesive in the joint is minimal. The majority of the solvent remaining in the adhesive bead is absorbed into the substrates.

Current adhesives and primers incorporate the use of highly volatile solvents as major portions of formulations. Typically, THF is a majority component of any PVC or CPVC pipe adhesive. MEK is the typical sole volatile component of any ABS pipe adhesive. These solvents are highly volatile at 20° C. with vapor pressures of 143 mm Hg (THF) and 75 mm Hg (MEK). Cosolvents currently used are Acetone @ 185 mm Hg, Cyclohexanone @ 2 mm Hg and DMF @ 2.6 mm Hg.

Typical PVC and CPVC formulations have VOC composite partial pressures of between 90 and 160 mm Hg @ 20° C. Most formulations fall in the 95–120 mm Hg range. By definition, since MEK is the only volatile component of ABS pipe adhesives, VOC composite partial pressure is 75 mm Hg @ 20° C.

Alternative true solvents for PVC and CPVC include N-Methyl-2-Pyrrolidone (M-Pyrol or NMP) and Cyclohexanone. These solvents are significantly less volatile (NMP=<0.1 mm Hg @ 20° C.; Cyclohexanone=2.0 mm Hg @ 20° C.) than THF. Adhesives may be compounded using NMP and/or Cyclohexanone as the major or sole solvent of a formulation while substantially reducing the composite vapor pressure.

Formulations have been developed which lower the VOC composite partial pressure to 50, 35, 5 or even <1 mm Hg @ 20° C. while meeting or exceeding certain standards which regulate adhesives used in the plastic pipe industry such as: ASTM D-2564, D-2235, D-2846 and F-493.

Cyclohexanone and NMP are true solvents for ABS and may be used in the same manner as previously described with PVC and CPVC. Adhesives may be compounded with VOC composite partial pressure 35 mm Hg or even lower @ 20° C.

The low vapor pressure solvents, NMP and Cyclohexanone, allow the continuance of using standard PVC, CPVC, AB, ACRYLIC resins to maintain the integrity of welded joints. Furthermore, they eliminate the need for primers due to the slow, deep penetration of these solvents into the pipe itself.

Thixotropic agents such as fumed silica (e.g. Cab-o-Sil, Aerosil) and treated bentonite clay (e.g. Bentone 27) may be used at low levels to obtain optimum flow properties, especially with regard to controlling spillage from the pipe upon application.

Low vapor pressure solvents help accomplish the monumental task of formulation adhesives which volatilize at a substantially reduced rate. Combining these solvents with the more standard solvents THF and MEK at reduced concentrations significantly lowers the emissions derived from adhesives used in the plastic pipe industry, while meeting or exceeding the standards of the industry. Thixotropic agents formulated into these adhesives make a tangible contribution to lowering the emissions through controlling spillage. These changes to current formulations are minimal to the end user from the standpoint of application, testing, economics and long term durability and liability.

| PARAMETERS OF A TYPICAL FORMULATION | | |
| --- | --- | --- |
| Solvents: | | % Concentration (100% solvent basis) |
| NMP | | 35-100 |
| CYCLOHEXANONE | | 35-100 |
| THF | | 0-35 |
| MEK | | 0-60 |
| DMF | | — |
| Resins: | % Concentration | Inherent Viscosity |
| PVC | 5-30 | 0.4-0.95 |
| CPVC | 5-30 | 0.4-0.95 |
| ABS | 15-45 | — |
| ACRYLIC | 5-55 | — |
| Thixotropic Agents | % Concentration | % Typical |
| Cab-O-Sil/Aerosil | 0.5-8.0 | 1.0-3.0 |
| Bentone 27 | 0.5-8.0 | 2.0-5.0 |

We claim:

1. A thermoplastic pipe adhesive mixture comprising:
   a) at least one resin either (1) selected from the group consisting of polyvinylchloride, chlorinated polyvinylchloride, and acrylic or (2) consisting essentially of acrylonitrile-butadiene-styrene;
   b) a solvent blend comprising either (i) a primary solvent consisting essentially of tetrahydrofuran and at least one secondary solvent of lesser amount selected from the group consisting of 1,1,1-trichloroethane, methylene chloride, cyclohexanone, N-methyl-2-pyrrolidone, methyl ethyl ketone, acetone, and dimethyl formamide for use with the group (1) resin or (ii) a primary solvent consisting essentially of methyl ethyl ketone and optionally at least one secondary solvent of lesser amount selected from the group consisting of 1,1,1-trichloroethane, methylene chloride, cyclohexanone, N-methyl-2-pyrrolidone, and acetone for use with the group (2) resin;
   c) a low specific gravity filler consisting essentially of hollow ceramic spheres; and
   d) a thixotropic agent for maintaining the homogeneous nature of the mixture.

2. A low vapor pressure thermoplastic adhesive consisting essentially of:
   a) one or more resins selected from the group consisting of polyvinylchloride, chlorinated polyvinylchloride, acrylonitrile-butadiene-styrene, and ACRYLIC;
   b) one or more solvents selected from the group consisting of N-methyl-2-pyrrolidone, cyclohexanone, tetrahydrofuran, methyl ethyl ketone, and dimethylformamide;
   c) a thixotropic agent for maintaining homogeneous nature of the mixture; and
   d) a low specific gravity filler consisting essentially of hollow ceramic spheres.

3. A low vapor pressure thermoplastic adhesive comprising:
   a) one or more resins selected from the group consisting of polyvinylchloride, chlorinated polyvinylchloride, acrylonitrile-butadiene-styrene, and ACRYLIC;
   b) one or more solvents selected from the group consisting of N-methyl-2-pyrrolidone, cyclohexanone, tetrahydrofuran, methyl ethyl ketone, and dimethylformamide; and
   c) a low specific gravity filler consisting essentially of hollow ceramic spheres.

4. The thermoplastic adhesive of claim 3 including; a thixotropic agent for maintaining homogeneous nature of the mixture.

5. The thermoplastic pipe adhesive mixture of claim 1 wherein said thixotropic agent comprises at least one of fumed silica or treated bentonite clay.

6. The thermoplastic pipe adhesive mixture of claim 1 further comprising a suspending agent to keep the ceramic hollow filler in suspension.

7. The thermoplastic pipe adhesive mixture of claim 6 wherein said suspending agent is selected from the group consisting of methacrylate butadiene styrene and acrylonitrile butadiene rubber.

8. The thermoplastic pipe adhesive mixture of claim 1 wherein said thixotropic agent comprises at least one of fumed silica or treated bentonite clay.

9. The thermoplastic pipe adhesive mixture of claim 4 wherein said thixotropic agent comprises at least one of fumed silica or treated bentonite clay.

10. A thermoplastic pipe adhesive mixture comprising:
    a) a resin mixture comprising acrylic and a resin selected from the group consisting of polyvinylchloride and chlorinated polyvinylchloride;
    b) a solvent blend consisting essentially of tetrahydrofuran, cyclohexanone, and methyl ethyl ketone; and
    c) a low specific gravity filler consisting essentially of hollow ceramic spheres.

11. The thermoplastic pipe adhesive mixture of claim 10 further comprising a thixotropic agent for maintaining the homogeneous nature of the mixture.

12. The thermoplastic pipe adhesive mixture of claim 10 further comprising a suspending agent for keeping the hollow ceramic spheres in suspension.

13. A thermoplastic pipe adhesive mixture comprising:
    a) at least one resin either (1) selected from the group consisting of polyvinylchloride, chlorinated polyvinylchloride, and acrylic or (2) consisting essentially of acrylonitrile-butadiene-styrene;

b) a solvent blend comprising a primary solvent consisting essentially of at least one of n-methyl-pyrrolidone and cyclohexanone and at least one secondary solvent of lesser amount comprising at least one solvent selected from the group consisting of tetrahydrofuran and methyl ethyl ketone; and c) a thixotropic agent for providing optimum flow properties of the mixture.

14. The thermoplastic pipe adhesive mixture of claim 13 wherein said thixotropic agent comprises at least one of fumed silica or treated bentonite clay; and d) a low specific gravity filler consisting essentially of hollow ceramic spheres.

15. A method for reducing volatile organic compound emissions from thermoplastic pipe adhesives, comprising formulating said adhesive by combining a) at least one resin either (1) selected from the group consisting of polyvinylchloride, chlorinated polyvinylchloride, and acrylic or (2) consisting essentially of acrylonitrile-butadiene-styrene;

b) a solvent blend comprising either (i) a primary solvent consisting essentially of tetrahydrofuran and at least one secondary solvent of lesser amount selected from the group consisting of 1,1,1-trichloroethane, methylene chloride, cyclohexanone, N-methyl-2-pyrrolidone, methyl ethyl ketone, acetone, and dimethyl formamide for use with the group (1) resin or (ii) a primary solvent consisting essentially of methyl ethyl ketone and optionally at least one secondary solvent of lesser amount selected from the group consisting of 1,1,1-trichloroethane, methylene chloride, cyclohexanone, N-methyl-2-pyrrolidone, and acetone for use with the group (2) resin;

c) a low specific gravity filler consisting essentially of hollow ceramic spheres; and d) a thixotropic agent for maintaining the homogenous nature of the mixture.

16. The method of claim 15 further including adding a suspending agent for keeping the hollow ceramic spheres in suspension.

17. A method for reducing volatile organic compound emissions from thermoplastic pipe adhesive mixtures, comprising formulating said adhesive by combining:

a) a resin mixture comprising acrylic and a resin selected from the group consisting of polyvinylchloride and chlorinated polyvinylchloride;

b) a solvent blend comprising tetrahydrofuran, cyclohexanone, and methyl ethyl ketone; and c) a low specific gravity filler comprising hollow ceramic spheres.

18. The method of claim 17 further including adding a thixotropic agent for maintaining the homogeneous nature of the mixture.

19. The method of claim 17 further including adding a suspending agent for keeping the hollow ceramic spheres in suspension.

20. A method for reducing volatile organic compound emissions from thermoplastic pipe adhesive mixtures, comprising formulating said adhesive by combining:

a) at least one resin either (1) selected from the group consisting of polyvinylchloride, chlorinated polyvinylchloride, and acrylic or (2) consisting essentially of acrylonitrile-butadiene-styrene;

b) a solvent blend comprising a primary solvent consisting essentially of at least one of n-methylpyrrolidone and cyclohexanone and at least one secondary solvent of lesser amount, comprising at least one solvent selected from the group consisting of tetrahydrofuran and methyl ethyl ketone; and c) a thixotropic agent for providing optimum flow properties of the mixture; and d) a low specific gravity filler consisting essentially of hollow ceramic spheres.

21. The method of claim 20 wherein said thixotropic agent comprises at least one of fumed silica or treated bentonite clay.

* * * * *